United States Patent [19]

Sadovnik et al.

[11] Patent Number: 5,497,430

[45] Date of Patent: Mar. 5, 1996

[54] METHOD AND APPARATUS FOR IMAGE RECOGNITION USING INVARIANT FEATURE SIGNALS

[75] Inventors: Lev S. Sadovnik, Los Angeles; Taiwei Lu, Torrance, both of Calif.

[73] Assignee: Physical Optics Corporation, Torrance, Calif.

[21] Appl. No.: 335,455

[22] Filed: Nov. 7, 1994

[51] Int. Cl.$^6$ .................................................... G06K 9/46
[52] U.S. Cl. ........................... 382/156; 382/118; 382/190
[58] Field of Search ...................................... 382/115, 116, 382/117, 118, 108, 110, 123, 156, 158, 157, 159, 190; 395/11, 21, 23, 24; 235/487, 488, 379, 380, 382

[56] References Cited

U.S. PATENT DOCUMENTS

| | | | |
|---|---|---|---|
| 3,571,796 | 3/1971 | Brugger | 382/223 |
| 4,975,960 | 12/1990 | Petajan | 381/43 |
| 5,012,522 | 4/1991 | Lambert | 382/2 |
| 5,163,094 | 11/1992 | Prokoski et al. | 382/2 |
| 5,164,992 | 11/1992 | Turk et al. | 382/2 |
| 5,255,347 | 10/1993 | Matsuba et al. | 395/23 |
| 5,263,097 | 11/1993 | Katz et al. | 382/48 |
| 5,274,714 | 12/1993 | Hutcheson et al. | 382/15 |
| 5,309,374 | 5/1994 | Misra et al. | 364/552 |
| 5,329,596 | 7/1994 | Sakou et al. | 382/37 |
| 5,331,544 | 7/1994 | Lu et al. | 364/401 |
| 5,371,809 | 12/1994 | Desieno | 382/15 |
| 5,386,103 | 1/1995 | DeBan et al. | 235/379 |
| 5,412,738 | 5/1995 | Brunelli et al. | 382/115 |
| 5,422,831 | 6/1995 | Misra et al. | 364/552 |

OTHER PUBLICATIONS

Hutchinson et al. Comparison of neural networks and conventional techniques for feature location in facial image, 1989.

Kobayashi et al. Recognition of Sti basic facial expression and their strength by neural network, 1992.

K. M. Lim, Y. C. Sim, and K. W. Oh, "A Face Recognition System Using Fuzzy Logic and Artificial Neural Network" IEEE International Conference on Fuzzy Systems Converence Paper, San Diego, pp. 1063–1069, (1992).

(List continued on next page.)

*Primary Examiner*—Michael T. Razavi
*Assistant Examiner*—Larry J. Prikockis
*Attorney, Agent, or Firm*—Nilles & Nilles

[57] ABSTRACT

A method of operating an image recognition system including providing a neural network including a plurality of input neurons, a plurality of output neurons and an interconnection weight matrix; providing a display including an indicator; initializing the indicator to an initialized state; obtaining an image of a structure; digitizing the image so as to obtain a plurality of input intensity cells and define an input object space; transforming the input object space to a feature vector including a set of n scale-, position- and rotation-invariant feature signals, where n is a positive integer not greater than the plurality of input neurons, by extracting the set of n scale-, position- and rotation-invariant feature signals from the input object space according to a set of relationships $I_k = \int_\Omega I(x,y) h[k, I(x,y)] dx dy$, where $I_k$ is the set of n scale-, position- and rotation-invariant feature signals, k is a series of counting numbers from 1 to n inclusive, (x,y) are the coordinates of a given cell of the plurality of input intensity cells, $I(x,y)$ is a function of an intensity of the given cell of the plurality of input intensity cells, $\Omega$ is an area of integration of input intensity cells, and $h[k, I(x,y)]$ is a data dependent kernel transform from a set of orthogonal functions, of $I(x,y)$ and k; transmitting the set of n scale-, position- and rotation- invariant feature signals to the plurality of input neurons; transforming the set of n scale-, position- and rotation- invariant feature signals at the plurality of input neurons to a set of structure recognition output signals at the plurality of output neurons according to a set of relationships defined at least in part by the interconnection weight matrix of the neural network; transforming the set of structure recognition output signals to a structure classification signal; and transmitting the structure classification signal to the display so as to perceptively alter the initialized state of the indicator and display the structure recognition signal for the structure.

20 Claims, 5 Drawing Sheets

OTHER PUBLICATIONS

C. L. Huang and C. W. Chen, "Human Facial Feature Extraction for Face Interpretation and Recognition" Pattern Recognition, vol. 25, No. 12, pp. 1435–1444 (1992).

R. Brunelli and T. Poggio, "Face Recognition Through Geometrical Features" Computer Vision, Second European Conference on Computer Vision, Proceedings, pp. 792–800 (1992).

S. Edelman, D. Reisfield, and Y. Yeshurun, "Learning to Recognize Faces from Examples" Proceedings of Computer Vision, ECCV '92, pp. 787–791 (1992).

S. Akamatsu, T. Sasaki, H. Fukamachi, N. Masui, and Y. Suenaga, "An Accurate and Robust Face Identification Scheme", Proceedings of the 11th IAPR Internal Conference of Pattern Recognition, vol. II, pp. 217–220 (1992).

P. Flocchini, F. Gardin, G. Mauri, M. P. Pensini, and P. Stufella, "Combing Image Processing Operators and Neural Networks in a Face Recognition System," Int. J. pattern Recog. Artif. Intell., vol. 6, No. 2–3, pp. 447–467 (1992).

T. Lu, X. Xu, S. Wu, and F. T. S Yu, "Neural Network Model Using Interpattern Association" Appl. Opt., 29, 2, 284 (1990).

N. Fapahati, A. Green, N. Piercy, and L. Robinson, "Real Time Recognition Using Novel Infrared Illumination" Opt. Eng., 31, pp. 1658–1662 (1992).

A. J. O'Toole, H. Abdi, K. A. Deffenbacher, and D. Valentin, "Low–Dimensional Representation of Faces in Higher Dimensions of the Face Space" J. Opt. Soc. Am. A, vol. 10, No. 3 (Mar. 1993).

M. A. Turk and A. P. Pentland, "Face Recognition Using Eigenfaces" Proc. IEEE, pp. 586–591 (1991).

M. Kirby and L. Sirovich, "Application of the Karhunen–Loeve Procedure for the Characterization of Human Faces" IEEE Transactions on Pattern Analysis and Machine Intelligence, vol. 12, No. 1 (Jan. 1990).

G. G. Gordon and L. Vincent, "Application of Morphology to Feature Extraction for Face Recognition" SPIE vol. 1658, Nonlinear Image Processing III (1992).

G. G. Gordon, "Face Recognition Based on Depth and Curvature Features," Proc. IEEE, pp. 808–810 (1992).

R. Y. Wong and J. Calia, "PC–Based Human Face Recognition System," Proc. IEEE, pp. 641–644 (1992).

N. M. Allinson and A. W. Ellis, "Face Recognition: Combining Cognitive Psychology and Image Engineering" Electronics and Communication Engineering Journal, vol. 4, No. 5, pp. 291–300 (Oct. 1992).

J. M. Vincent, J. B. Waite, D. J. Myers, "Multilayered Perceptrons," IEEE Proceedings–F, vol. 139, No. 6, pp. 405–412 (Dec. 1992).

P. Seitz and M. Bichsel, "The Digital Doorkeeper'—Automatic Face Recognition with the Computer," IEEE International Carnahan Conference on Security Technology, Conference Paper, pp. 77–83 (1991).

G. Champleboux, S. Lavallee, R. Szeliski, L. Brunie, "From Accurate Range Imaging Sensor Calibration to Accurate Model–Based 3–D Object Localization" Proc. IEEE, pp. 83–89 (1992).

M. Siebert and A. M. Waxman, "Recognizing Faces From Their Parts" SPIE vol. 1611, Sensor Fusion IV (1991).

S. Akamatsu, T. Sasaki, N. Masui, H. Fukamachi, and Y. Suenaga, "A New Method for Designing Face Image Classifiers Using 3–D CG Model," SPIE vol. 1606, Visual Communications and Image Processing '91: Image Processing (1991).

A. M. Coombes, et al., "Description and Recognition of Faces from 3–D Data" SPIE, vol. 1766, Neural and Stochastic Methods in Image and Signal Processing, pp. 307–319 (1992).

METHOD AND APPARATUS FOR IMAGE RECOGNITION USING INVARIANT FEATURE SIGNALS

BACKGROUND OF THE INVENTION

1. Field of Use

The present invention relates generally to the field of image recognition. More particularly, the present invention concerns methods and apparatus for recognition of facial images. Specifically, a preferred embodiment of the present invention is directed to a method and apparatus for automatic face recognition by scale, position and rotation (SPR) invariant feature extraction. The present invention thus relates to methods and apparatus for face recognition of the type that can be termed invariant feature extractive.

2. Description of Related Art

Within this application several publications are referenced by arabic numerals in parenthesis. Full citations for these references may be found at the end of the specification immediately preceding the claims. The disclosures of all these references in their entireties are hereby expressly incorporated by reference into the present application for the purposes of indicating the background of the invention and illustrating the state of the art.

An important concern at security facilities is access control. This is a particularly acute problem at highly classified facilities where hundreds of employees must be identified as they enter. Identification (ID) cards are commonly checked by security personnel in such limited access areas. Because of human error, subjectivity, bias and even conspiracy, it would be technically and economically advantageous to automate this process. Indeed, during peak hours an automatic door keeper would reduce frustrating employee lines, as well as problems with stole and lost ID cards. In addition, the installation of several gatekeeping systems inside a limited access facility would permit better protection against intrusion and tighten access to designated areas within the facility.

Accordingly, an automatic face recognition system has long been sought by security agencies, law enforcement agencies, the airline industry, the border patrol, local authorities, and many other organizations. Examples of other potential applicatons are entry control to limited access areas, such as secure facilities in industry, banks, and various private institutions, secure access to computers and video communications, including video telephones, and user verification for automated teller machines (ATM) and credit cards.

The class of techniques that use biological features to classify a person's identity are biometric techniques. Face recognition is such a biometric technique.

Face recognition has an important advantage over other biometric techniques. Face recognition can be both non-invasive and unnoticeable to the subject under investigation. In contrast, fingerprinting and retinal pattern analysis do not share these advantageous features.

Automatic face recognition techniques have a unique place among automatic pattern recognition (APR) technology. Existing APR technology, in general, cannot yet match the performance of a human operator in dealing with a limited number of objects to be classified under varied and frequently noisy conditions. In contrast, APR techniques can deal with a very large number of objects, such as faces, whose classification is beyond the capacity of a human operator simply because of inability to memorize many names and faces, especially after only a single learning exposure.

Heretofore, techniques have been developed in the prior art in an attempt to analyze and identify human faces. For example, an eye blinking method was proposed to recognize individuals by the location, shape and distance between a given set of eyes[1]. The nose, the mouth, and the outline of the face have also been used to identify faces[1-4]. Color image segmentation and the K-L transformation have been used to extract facial features[5]. Neural network classifiers have also been used to perform robust pattern recognition operations[1,6].

Further, the below-referenced prior patents disclose techniques that were at least in-part satisfactory for the purposes for which they were intended but which had disadvantages. The disclosures of all the below-referenced prior patents in their entireties are hereby expressly incorporated by reference into the present application.

U.S. Pat. Nos. 5,331,544, 5,012,522 and 4,975,960 disclose digitizing data for further processing. U.S. Pat. No. 5,274,714 discloses the use of a frame grabber for digitizing data to be subsequently processed by a neural network. U.S. Pat. Nos. 5,263,097 and 5,255,347 disclose feature extraction for subsequent processing with a neural network.

The above and other techniques, share several common problems. Some of the techniques may take several stages of complex operations to extract features. Some of the techniques require intensive computation which becomes an obstacle to system speed. Many of the recognition techniques are not invariant to position, tilt, and distance and require the individual to place his/her head in a certain position, thus prohibiting the use of such techniques in portal control applications. Many of the techniques require the storage of high resolution face images and/or complex feature vectors in a database. Any one of these disadvantages creates both speed and memory space problems for the use of these techniques in large database applications.

SUMMARY OF THE INVENTION

It is therefore an object of the present invention to provide a method of operating an image recognition system comprising: providing a neural network including a plurality of input neurons, a plurality of output neurons and an interconnection weight matrix; providing a display including an indicator, said display being electrically connected to said neural network; initializing the indicator to an initialized state; obtaining an image of a structure; digitizing the image so as to obtain a plurality of input intensity cells and thereby define an input object space; transforming the input object space to a feature vector including a set of n invariant feature signals, Where n is a positive integer not greater than the plurality of input neurons, by extracting the set of n invariant feature signals from the input object space according to a set of relationships $I_k = \int_\Omega \int I(x,y) h[k,I(x,y)] dx dy$ where $I_k$ is the set of n invariant feature signals, k is a series of counting numbers from 1 to n inclusive, (x,y) are the coordinates of a given cell of the plurality of input intensity cells, I(x,y) is a function of an intensity of the given cell of the plurality of input intensity cells, $\Omega$ is an area of integration of input intensity cells, and h[k,I(x,y)] is a data dependent kernel transform from a set of orthogonal functions, of I(x,y) and k, and optionally decreases as k increases; transmitting the set of n invariant feature signals to the plurality of input neurons of the neural network; transforming the set of n invariant feature signals at the plurality of input neurons to a set of structure recognition output signals at the plurality of output neurons according to a set of relationships defined at least in part by the interconnection weight matrix of the neural network; transforming the set of structure recognition output signals to a structure classification signal; and transmitting the structure classification signal to the display so as to perceptively alter the initialized state of the indicator and display the structure recognition signal for the structure.

In accordance with this aspect of the present invention, a method of operating an image recognition system is provided comprising: providing a camera; providing a neural network including a plurality of input neurons, a plurality of output neurons and an interconnection weight matrix; providing a display including an indicator, said display being electrically connected to said neural network; initializing the indicator to an initialized state; obtaining an image of a structure from the camera; digitizing the image so as to obtain a plurality of input intensity cells and thereby define an input object space; transforming the input object space to a feature vector including a set of n invariant feature signals, where n is a positive integer not greater than the plurality of input neurons, by extracting the set of n invariant feature signals from the input object space according to a set of relationships $I_k = \int_\Omega I(x,y) h[k, I(x,y)] dx dy$, where $I_k$ is the set of n invariant feature signals, k is a series of counting numbers from 1 to n inclusive, (x,y) are the coordinates of a given cell of the plurality of input intensity cells, I(x,y) is a function of an intensity of the given cell of the plurality of input intensity cells, $\Omega$ is an area of integration of input intensity cells, and h[k,I(x,y)] is a data dependent kernel transform from a set of orthogonal functions, of I(x,y) and k, and optionally decreases as k increases; transmitting the set of n invariant feature signals to the plurality of input neurons of the neural network; transforming the set of n invariant feature signals at the plurality of input neurons to a set of structure recognition output signals at the plurality of output neurons according to a set of relationships defined at least in part by the interconnection weight matrix of the neural network; transforming the set of structure recognition output signals to a structure classification signal; and transmitting the structure classification signal to the display so as to perceptively alter the initialized state of the indicator and display the structure recognition signal for the structure.

Further in accordance with the above aspects of the present invention, an image recognition system is provided comprising a neural network including a plurality of input neurons, a plurality of output neurons and an interconnection weight matrix; a display including an indicator, said display being electrically connected to said neural network; means for initializing the indicator to an initialized state; means for obtaining an image of a structure; means for digitizing the image so as to obtain a plurality of input intensity cells and thereby define an input object space; means for transforming the input object space to a feature vector including a set of n invariant feature signals, where n is a positive integer not greater than the plurality of input neurons, by extracting the set of n invariant feature signals from the input object space according to a set of relationships $I_k = \int_\Omega I(x,y) h[k, I(x,y)] dx dy$, where $I_k$ is the set of n invariant feature signals, k is a series of counting numbers from 1 to n inclusive, (x,y) are the coordinates of a given cell of the plurality of input intensity cells, I(x,y) is a function of an intensity of the given cell of the input intensity cells, and h[k,I(x,y)] is a data dependent kernel transform from a set of orthogonal functions, of I(x,y) and k, and optionally decreases as k increases; means for transmitting the set of n invariant feature signals to the plurality of input neurons of the neural network; means for transforming the set of n invariant feature signals at the plurality of input neurons to a set of structure recognition output signals at the plurality of output neurons according to a set of relationships defined at least in part by the interconnection weight matrix of the neural network; means for transforming the set of structure recognition output signals to a structure classification signal; and means for transmitting the structure classification signal to the display so as to perceptively alter the initialized state of the indicator and display the structure recognition signal for the structure.

Other aspects and objects of the present invention will be better appreciated and understood when considered in conjunction with the following description and drawings.

BRIEF DESCRIPTION OF THE DRAWINGS

The advantages and features of the present invention will become more readily apparent with reference to the detailed description which follows and to exemplary, and therefore non-limiting, embodiments illustrated in the following drawings in which like reference numerals refer to like elements and in which.

DESCRIPTION OF THE PREFERRED EMBODIMENTS

The present invention and various aspects, objects, advantages, features and advantageous details thereof are explained more fully below with reference to exemplary, and therefore non-limiting, embodiments described in detail in the following disclosure and with the aid of the drawings. In each of the drawings, parts the same as, similar to, or equivalent to each other, are referenced correspondingly.

1. Resume

All the disclosed embodiments are useful in conjunction with face recognition systems such as are used for the purpose of restricting access at the entrances to, or within, limited access areas, or for the purpose of user verification at video telephones, automated teller machines, or the like. All the disclosed embodiments can be realized using conventional components and procedures without undue experimentation.

2. System Overview

The present invention is capable of performing as an automatic face recognition and identification (AFRAID) system which performs human face identification in real time. Among the many scenarios in which the AFRAID system could be exploited to secure access to classified facilities, a preferred embodiment is as a portal or gate control system for a building. Every face entered into a system according to the present invention can be used to update the database so that gradual changes in human appearance are accommodated. Only such extreme measures as plastic surgery or the shaving of a beard would require the intervention of security personnel.

3. First Embodiment

Figure 1:
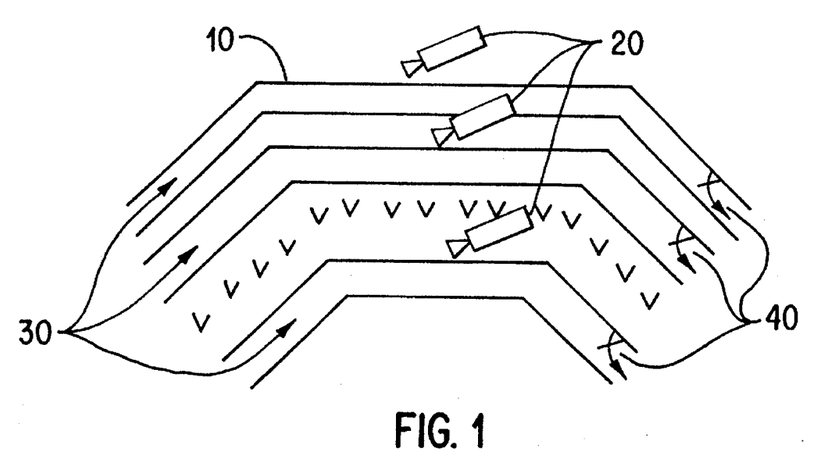
FIG. 1 illustrates a schematic diagram of an automatic door keeper at multiple entrance corridors according to the present invention.

Referring to FIG. 1, an AFRAID system according to the present invention is preferably capable of operating in two modes. In a first identification modality, employees entering the security gate 10, are screened by standard video cameras 20. During the employee's walk through the entrance corridor 30, the AFRAID system can make a decision regarding the person's right to enter the building. If the system decides an individual should be barred from the facility, the system shuts the door 40, or blocks a turnstile, at the end of the corresponding entrance corridor 30, as shown in FIG. 1.

4. Second Embodiment

For enhanced security, the AFRAID system can perform verification in a second modality. In this modality, a person can be required to position themselves in the view of a camera and enter his/her personal identification number (PIN) in order to initiate the face verification process. While the first modality requires a search of all faces in a database, the second modality is limited to a simple verification of the identity of an individual face, with a high rejection rate (i.e., a low false acceptance rate) of all other faces.

5. Detailed Description

It is clear that a robust, high confidence rate face recognition system is required to successfully replace security personnel at an entrance gate. Most of the hardware needed to accomplish automated doorkeeping is already in place. Surveillance cameras and computers (e.g., personal computers or workstations) are typical components of any security installation. The only additionally required hardware is an image digitizer (i.e., a frame grabber) computer board. Therefore, an AFRAID system according to the present invention can be inexpensive. The centerpiece of the present invention is an innovative face recognition algorithm and its software implementation to operate the hardware.

The present invention allows for robust and high-speed identification of a specific face from among many faces resident in a large database. The present invention is based on a unique combination of a robust face feature extractor and a highly efficient artificial neural network. A real-time video image of a face can serve as the input to a high-speed face feature extractor, which responds by transforming the video image to a mathematical feature vector that is highly invariant under face rotation (or tilt), scale (or distance), and position conditions. While not being bound by theory, this highly invariant mathematical feature representation is a major reason for the extremely robust performance of the present invention. A feature extractor according to the present invention is advantageously capable of the rapid generation of a mathematical feature vector of at least 20 to 50 elements from a face image made up of, for example, 256×256 or 512×512 pixels. This represents a data compression of at least 1000:1. The feature vector is then input into the input neurons of a neural network (NN), which advantageously performs real-time face identification and classification.

Such an effective feature extractor is capable of dramatically reducing the dimensions of the input object space by carrying compressed information. The resulting features make the search space less complex, which in turn significantly increase the convergence speed of the neural network's learning procedure.

In addition to reducing the number of features required for facial image representation, the other major task for the extractor is to generate a set of invariant features. For face identification, that means scale-, position- and rotation- (SPR) invariance. The importance of invariance can not be overstated because it eliminates the necessity of a fixed face location, thus permitting noncooperative face recognition at a single pass. While it is clear that out-of-plane head movements (i.e., different aspect angles) form essentially new facial images and can be identified as belonging to one face only by accumulating a sufficient number of poses, the in-plane SPR changes can be compensated for by extracting invariant features. Such an effective extractor would not require additional image processing for image centering, orientation correction, and scale adjustment.

Figure 2:
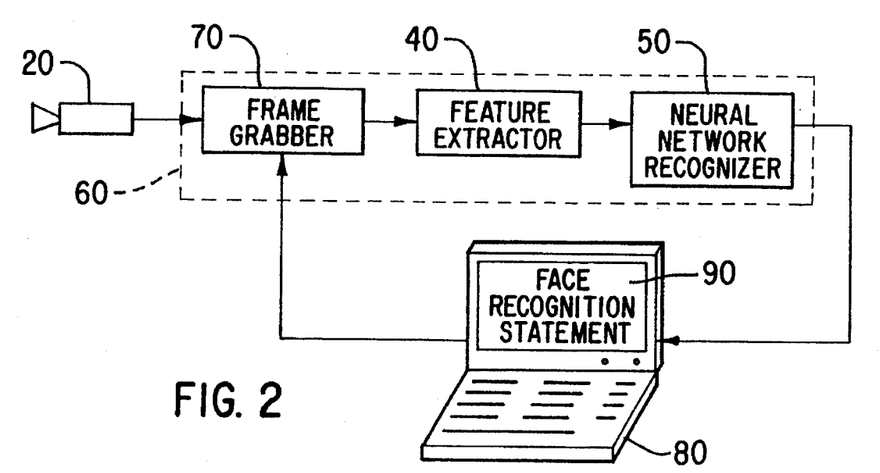
FIG. 2 illustrates a schematic diagram of a real-time face recognition system according to the present invention.

Referring to FIG. 2, a schematic diagram of a preferred real-time face recognition system can be seen. The diagram shows a potential hardware implementation of the feature extractor 40, and neural network recognizer 50. The feature extractor 40, and neural network recognizer 50, share a digital signal processor (DSP) board 60, with the frame-grabber 70. Computer 80, includes a display 90, that can perceptively depict an initializable structure recognition signal such as, for example, a face recognition statement.

In general, kernel (integral) transforms provide a powerful tool for linear analysis, but they are inefficient when distorted signals are presented. Although some integral transforms, such as moments, can be used to implement SPR invariance, they are extremely unstable due to the polynomial nature of the kernel (especially for higher order moments).

The present invention includes a new class of algorithms designed to take advantage of both kernel transforms and matched filter operations. This new class of algorithms belongs to the kernel transform class, but with a kernel which is data-dependent.

Figure 3A:
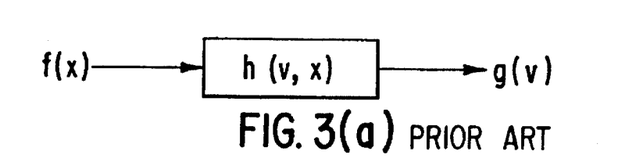
FIG. 3A illustrates a conventional kernel transform model appropriately labeled "PRIOR ART"
Figure 3B:
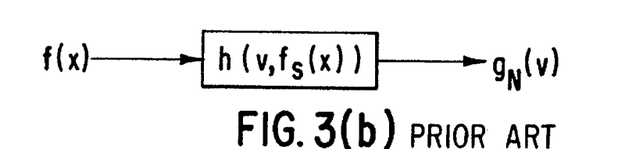
FIG. 3B illustrates a class of kernel transform model according to the present invention.

FIGS. 3A and 3B illustrate the difference between conventional kernel transforms and transforms according to the invention. Here h(') can be any kernel function, such as from a Fourier Transform (FT), windowed FT, Gabor Transform (GT), Ambiguity Function (AF), Wignet Distribution (WD), Wavelet Transform (WT) or others. Referring to FIG. 3B, $f_s(.)$ can be either a linear (e.g., high-pass or low-pass filtering) or nonlinear function of the signal f(x). Thus, according to the present invention both h(.) and $f_s(.)$ can be selected to enhance some portions of the input or its spatial frequency content, without losing the SPR invariant features.

The operation of the invariant feature extractor according to the present invention can be expressed by the following equation:

$$F(w) = \int_{-\infty}^{+\infty} \int I(x,y) h[w, I(x,y)] dx dy \qquad \text{Eq. (1)}$$

where I(x,y) represents the input face image, F(w) is the invariant feature vector, and h[w,I(x,y)] is a kernel function that is based on the input image itself. Since the transformation in Eq. (1) projects the input image onto a space that is spanned by vectors related to the input image itself, F(w) preserves the rotation-, scale-, and shift-invariance of the input image. A proof of the invariance of the transformation is provided below.

The SPR-invariant property of the data dependent kernel transform becomes clear from the following consideration. Let Ikk=0, 1, 2, . . . N, denote a set of extracted features $I_k = \int_\Omega \int I(x,y)h[k,I(x,y)]dxdy$ where I(x,y) is an input image. Let us also assume that the image scene has already been segmented (but not centered) so that the object of interest appears against a background that can be ignored. Under these conditions, we can shift the object by a vector $$\begin{bmatrix} x_o \\ y_o \end{bmatrix}$$

within the input frame, rotate it by an angle $\phi$, and scale it up or down by a factor $\alpha$, all simultaneously. The corresponding coordinate transformation in vector form is $$\begin{bmatrix} x' \\ y' \end{bmatrix} = \alpha \left( \begin{bmatrix} x_o \\ y_o \end{bmatrix} + \begin{bmatrix} \cos\phi & \sin\phi \\ -\sin\phi & \cos\phi \end{bmatrix} \begin{bmatrix} x \\ y \end{bmatrix} \right).$$

. Since the object movement and possible expansion are still within the input window, the integration limits will be unchanged and $$I_k' = \int_\Omega \int I(x',y')h[k,I(x',y')]dxdy =$$

$$= \frac{1}{\alpha} \int_\Omega \int I(x',y')h[k,I(x',y')] \frac{dx'dy'}{detR} =$$

$$= \frac{1}{\alpha} I_k$$

since $det R = det \begin{bmatrix} \cos\phi & \sin\phi \\ -\sin\phi & \cos\phi \end{bmatrix} = 1.$ Clearly, the normalized intensity $(I_k^N)$ is SPR invariant, $$(I_k^N) = \frac{I_k'}{I_k} = \text{constant},$$

under all possible shifts $$\begin{bmatrix} x_o \\ y_o \end{bmatrix},$$

rotations $0 \leq \phi \leq 2\pi$, and all size changes by a factor $\alpha > 0$, as long as the object is kept inside the input aperture and the background's contribution to the output is negligible. This means that the normalized output data, $(I_kN)$ (k=0, 1, 2, . . . ) will be identical, regardless of the SPR of the presented input image transformation.

As discussed above, the invariant feature extraction algorithm is capable of distance- (or zoom-), tilt- and position-invariant feature extraction. The algorithm is especially suitable for face recognition since it is data-dependent, and the face typically contains a significant information about intensity distribution. The difference between faces can be characterized by the output vector I of the invariant algorithm. In order to classify similar faces, the algorithm must be sensitive to small variations in face intensity distribution. The weighted minimum-mean-distance criterion can be used to evaluate the performance of the feature extraction algoritim:

$$d_i = \left[ \sum_{k=1}^{N} \frac{([I_k^{(r)}] - [I_k^{(i)}])^2}{(G_{ki})^2} \right]^{1/2}$$

where $I_k^{(i)}$ is a selected reference feature vector, and $I_k^{(r)}$ is a feature vector of a tested face image. $G_{ki}$ is used as a weighing factor for the Euclidean distance. $I_k$ components may have significant differences in value and $G_{ki}$ must be introduced to balance this effect. The algorithm optimization can be achieved by varying kernel function parameters.

While not being limited to any particular mathematical relationship, preferred embodiments of the present invention can also be identified one at a time by testing for speed of convergence. The test of speed of convergence can be carried out without undue experimentation by performing a simple and conventional measurement of convergence time on the same set of input data. Among the other ways in which to seek embodiments having the attribute of convergence, guidance toward the next preferred embodiment can be based on speedy convergence on the same set of input data in the presence of noise.

In a preferred embodiment, the video camera takes a live image of a human face and sends the input image to a dedicated digital-signal-processor (DSP) board for digitization, feature extraction, and final face recognition. The present invention can also be configured to automatically identify a face from a video tape. Both the feature extractor and the neural network recognizer can be implemented in software. A personal computer can be used to control the real-time operation and to display the results.

The invariant feature extractor according to the present invention belongs to a class of invariant algorithms (i.e., rotation-, scale- and position-invariant). However, a different kernel function can be used in different feature extractors according to the present invention to enhance some part of the input or the input's spatial frequency content. This should generally result in a more robust identification. Furthermore, in a preferred embodiment, if the resulting identification confidence measure is low, the face identification system can request another "look" at the same face. During this additional examination, a different set of kernel functions can be used for the feature extractors to improve identification confidence.

The class of invariant algorithms used in the feature extractor is capable of mapping m-dimensional input data into n-dimensional invariant data n<<m, thus effecting very high data compression. This reduces the amount of training and identification work which needs to be performed by the subsequent neural network. The key aspect of the feature extraction algorithm is that it involves a dependent property, (i.e., the kernel function varies with the input data). While not being bound by theory, it is believed that the data dependence of the feature extraction algorithm is the reason why the present invention results in a high confidence measure with only a one-step process without requiring iteration in a hierarchical architecture to build up confidence.

An image is digitized to provide an input object space. The input object space is then transformed to a feature vector that includes a set of invariant feature signals. The set of invariant feature signals from the input object space can be extracted by normalizing the input object space according to the set of relationships $I_k = \int_\Omega \int I(x,y)h[k,I(x,y)]dxdy$, where h[k,I(x,y)] is a set of orthogonal (e.g., perpendicular) functions each of which is a function of I and usually decreases as k increases. The integral of such a function times itself, but with a different coefficient k is zero. For example, the set of invariant feature signals from the input object space can be extracted by normalizing the input object space according to the set of relationships $I_k = \int_\Omega I(x,y) h[k, I(x,y)] dx dy$, where $h[k; I(x,y)]$ is a sinc function. Such a sinc function is equivalent to $\sin f(x)/f(x)$.

As a further example, the set of invariant feature signals from the input object space can also be extracted by normalizing the input object space according to the set of relationships $I_k = \int_\Omega I(x,y) h[k, I(x,y)] dx dy$, where $h[k, I(x,y)]$ is a Bessel function. A Bessel function is one of several transcendental functions, usually represented as power series, that are solutions to a group of related differential equations.

The AFRAID system can provide 90%, preferably 95%, more preferably 99%, confidence of real-time (i.e., less than approximately 3 seconds) recognition, and can tolerate variations in facial expression (e.g., grimacing) as well as limited ±5°, preferably ±10°, more preferably ±20°, changes in aspect. The above 99% confidence rate implies less than a 1% false rejection rate and about a 0.1% false acceptance rate.

A system in accordance with the present invention can function as a stand-alone device and such a stand-alone device can include a database capable of accommodating at least 30,000 enrollees. For a single entry gate, the cost of the AFRAID system according to the present invention will be low.

There are several popular neural network models for pattern recognition operations suitable for use in conjunction with the present invention. A back-propagation algorithm is a good candidate; however, the learning speed is rather slow. Another candidate is the Gray Scale Inter-Pattern Association (GS-IPA) model. The GS-IPA model is very effective in classifying features from the input training patterns and distinguishing among similar patterns. It is also a fast-learning neural network model and therefore is suitable for large-scale network training and robust pattern recognition. The GS-IPA neural network can be used to train the initial interconnection weight matrix with the feature vectors from the invariant feature extraction algorithm, then the neural network will be further fine tuned by back-propagation learning. Other neural network models, such as the back-propagation model, Kohonen's self-organizing feature map model, and the Neural-Tree model can be used for comparison. Further, neural network simulators, such as Neural Work Professional II/Plus and BrainMaker Professional can be used for comparison.

The neural network used in an AFRAID system according to the present invention can be based on conventional techniques such as back-propagation. However, a preferred embodiment includes a neural network algorithm based on the Inter-Pattern Association (IPA) model[7]. The IPA model can be used for both binary-valued and gray-level-valued neurons. Its usefulness has been experimentally proven for various applications, including automated target recognition of 2-D military targets and spectral signature identification for chemical agent detection or radar signal processing. The key features of the IPA model are its training and identification speed and its robustness in distinguishing between similar input patterns.

A preferred embodiment of the present invention includes a complete C-language-based software package. Such a package would advantageously be capable of acquiring input images from the input device interface, calculating the invariant feature vector of the input images, and performing high-speed neural network training, database management, and face recognition operations, and also displaying the results on a computer monitor as a perceptible signal. The software package is advantageously user-friendly and preferably requires no knowledge of the algorithm and neural network used. Such a software package is also advantageously used for performance evaluation.

The software package can be used to test the robustness and speed of the present invention. Evaluation criteria can include: the maximum size of the database, the minimum size of the network, training speed, recognition speed, correct recognition rate, confidence measure, and false alarm rate.

The combination of the present feature extractor and a neural network results in a powerful face identification technique. The present invention enables one-step face identification under different distortions: rotation (or tilt), position, and scale (or distance). Face identification at different aspect angles is also possible and the neural network can be trained for different aspect angles using only a few aspect angles during training of the neural network.

The present invention provides the following key features. A fast distortion-invariant (rotation, scale, and position) feature extractor algorithm with a data-dependent kernel function and advantageously a class of kernels, each enhancing a key portion of the input or its spatial frequency content. A fast and robust neural network, capable of being trained for various aspect angles of a face. The high data compression rate of the invariant feature extractor permits the construction of a large database of thousands of individuals in a relatively small memory space.

A comparison of five existing face recognition methods with the present invention (i.e., Method No. 6) is given in Table I (set forth below).

TABLE I

| | | | | | | |
|---|---|---|---|---|---|---|
| | | | | | | Comparison of Six Methods of Automated Face Recognition |
| Method No. | 1<br>Eigenfaces | 2<br>Geometrical Conditions | 3<br>Pyramid Approach | 4<br>Face Structure Modeling | 5<br>Facial Patches | 6<br>AFRAID |
| Features | Global. Coefficients of face decomposition into finite series of 2-D matrices (eigenfaces) | Local. Anthropometric measurements of the face. Usually fewer than 22 features quantifying anthropological characteristics of the human face: | Same as Method #2 | Same as Method #2 | Local. Quantitative characteristics of different types of geometric surfaces (peaks, ridges, saddle ridges, minimal pits, valleys, saddle valleys, flats) | Global. Lebesgue like orthogonal integral transform |

TABLE I-continued

Comparison of Six Methods of Automated Face Recognition

| Method No. | 1<br>Eigenfaces | 2<br>Geometrical<br>Conditions | 3<br>Pyramid<br>Approach | 4<br>Face Structure<br>Modeling | 5<br>Facial Patches | 6<br>AFRAID |
|---|---|---|---|---|---|---|
| | | thickness of eyebrows, vertical position and thickness of nose, eleven radii describing shape of chin, etc. | | | representing portions (patches) of the face. | |
| Invariant Identification Capability | Translation invariance only | Translation and partial rotation invariance; scale dependent | Same as Method #2 | Same as Method #2 | Same as Method #2 | True translation, rotation and scale invariance |
| Information Source | 2-D face image | Portions of a 2-D face image | Portions of a 2-D face image | Portions of a 3-D face image | 3-D face image | 2-D face image; possible extension to 3-D face image |
| Tolerance to Aspect Variance and Grimacing | Sensitive to variation in facial expression and aspect | Same as Method #1 | Same as Method #1 | Same as Method #1 | Same as Method #1 | Experimentally demonstrated tolerance to aspect variation; high tolerance to grimacing |
| Final Classifier | Euclidean distance | Standard neural net or Euclidean distance | Same as Method #2 | Same as Method #2 | Euclidean distance | Neural net, enhanced by Inter-Pattern Association technique |
| Experimental Demonstration | Largest known data based of still images; very few images of one face are used for recognition | Small database of still images only | Face position fixed, live recognition | Face position still image recognition; no real-time demonstration | None | Live image, real time translation tilt, and distance invariant face recognition demonstration; 15 person database |
| Specific Assumptions | A limited number of eigenfaces can approximate the full face space | Recognition of a large number of faces in a database can be attained with a limited number of anthropological measurements taken with limited accuracy | Same as Method #2 | Same as Method #2 | Recognition of a large number of faces in a database can be attained with a limited number of topological measurements taken with limited accuracy | None |
| Convergence to Absolute Recognition | Unknown | Weak: any increase in the number of features requires extraordinary improvement in feature extraction accuracy | Same as Method #2 | Same as Method #2 | Same as Method #2 | Convergent* |
| Pre-processing | None** | Intensive: localization of major portions of the face | Multi-resolutional image analysis | Same as Method #2 | None | None |
| Hardware Requirements | Standard*** | Standard | Standard | Special equipment: 3-D scanner, 3-D image-rendering system | Same as Method #4 | Standard |
| Potential Application | Limited to the applications with a restricted head position | Same as Method #1 | Same as Method #1 | Same as Method #1 | Same as Method #1 | No restriction on head position; hidden camera, non-interfering identification |
| Recent Source of Information | Refs. (9, 10, 11) | Refs. (12, 3, 13, 14) | Refs. (1, 15, 16) | Refs. (17, 18, 19) | Refs. (20, 21) | |

*Convergence enhanced by gray level resolution.
**All methods listed require segmentation (face isolation) as pre-processing.
***Standard package includes a video camera, a frame grabber, and a PC.

*** Standard package includes a video camera, a frame grabber, and a PC.

As seen in Table I, the present invention has the advantage of robust invariant identification while requiring a simple hardware configuration and only a limited computational intensity.

The present face recognition algorithm and related software for a meaningful database will open the way for operating an AFRAID network using already existing closed-circuit television (CCTV) cameras. The system, as depicted in FIG. 4, not only monitors entry gates but also controls personnel movement inside the building.

Figure 4:
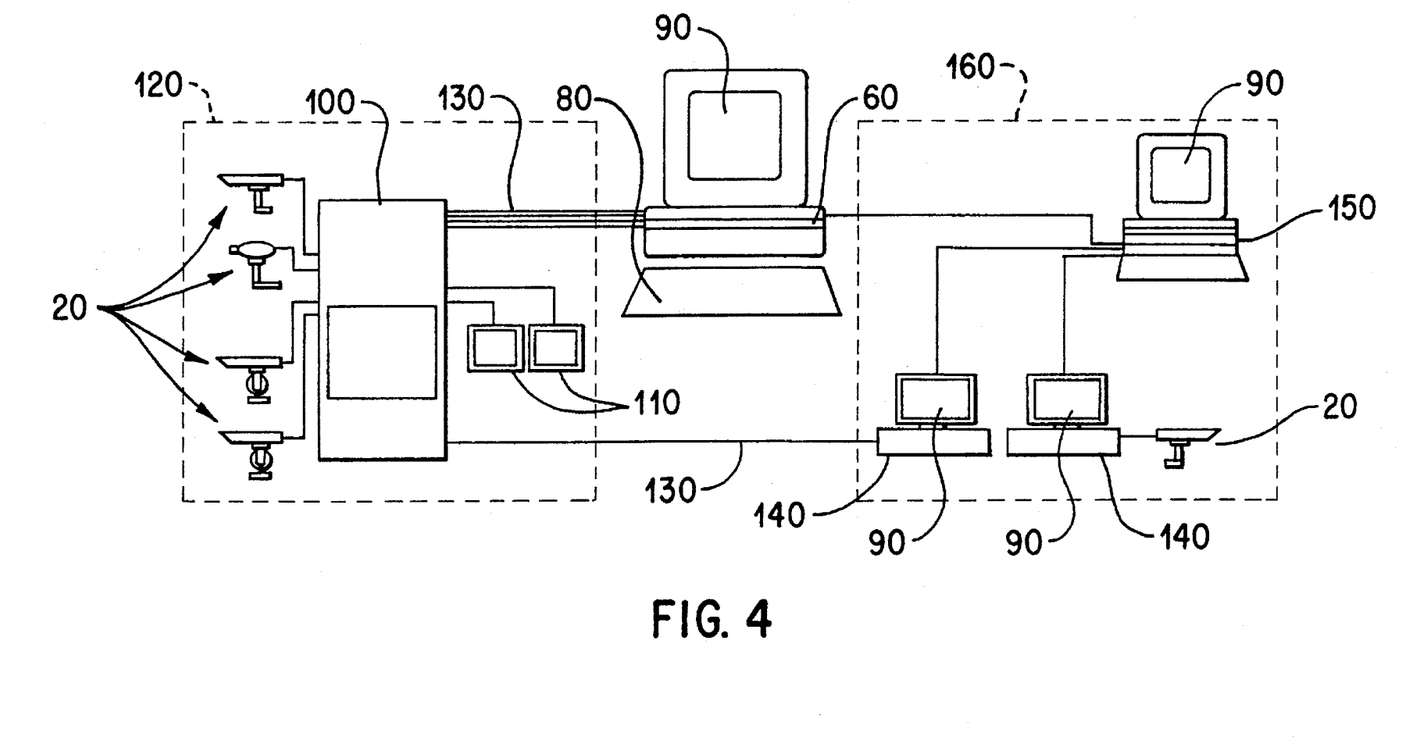
FIG. 4 illustrates a schematic diagram of a complete automatic face recognition identification system according to the present invention.

Referring to FIG. 4, standard video cameras 20, are connected to a closed circuit television video control 100. Closed circuit television monitors 110, are connected to closed circuit television video control 100. Closed circuit television cameras 20, closed circuit television video control 100, and closed circuit television monitors 110 can all be part of an existing closed circuit television system 120. Closed circuit television video control 100, is connected to digital signal processor board 60, of computer 80, through video inputs 130. Computer 80 advantageously includes a display 90, through which a human operator can interface with a perceptively depicted initializable structure recognition signal. The closed circuit television video control 100, can also advantageously be connected to multiple AFRAID slave units 140 through video inputs 130. Each multiple AFRAID slave unit 140, advantageously includes a display 90. A multiple AFRAID slave unit 140, can also advantageously include a closed circuit television camera, 20. Each of the multiple AFRAID slave units 140, can be connected to a central supervisor PC 150. Similarly, the AFRAID PC 80, can be connected to the supervisor PC 150. The supervisor PC 150 can be part of a larger optional real-time data processing and display supervisor-slave system 160.

Significantly, the present invention does not impede the use of CCTV cameras for the security and safety functions for which they were primarily installed. Rather, it allows them to be more fully utilized.

Although the AFRAID system utilizes normalized SPR features, this guarantees independent recognition only under substantially constant average light illumination levels. For an indoor controlled environment this is sufficient. However, to expand the AFRAID technology to situations where the angle of illumination may vary, causing varying shadows, a preferred embodiment uses infra-red (IR) illumination[8]. An independent IR source can provide a reproducible illumination condition in a manner invisible to the human eye. In order to effectively overpower the ambient light by the use of IR illumination, the IR source must have a narrow spectral band. At the same time, one would like to use existing inexpensive CCD video cameras. Both requirements suggest the use of the spectral band of 950 to 1000 nm. An IR face image can be obtained using either a narrow band filter adjusted to the IR source or by subtracting two consecutive images, taken with and without IR illumination. The latter can be easily implemented in hardware without adding extra complexity to the system.

The required power of the IR source can be estimated based on a 50:1 contrast ratio between the IR illumination and the ambient light[8]. Taking into account that only 0.5% of the ambient light (color temperature 5500 K) falls into the selected spectral band, a 50 W peak power IR source will be sufficient for obtaining an IR face image. IR pulse light emitting diodes (LEDs) are an inexpensive and power saving means of providing such illumination. Clearly, LED flash synchronization with frame grabbing is necessary; this can be accomplished with ease.

Another concern associated with the AFRAID system is its ability to identify or reject disguised faces. To deal with this problem, a preferred embodiment of the invention can include IR passive imaging developed by Mikos Ltd. This commercially available system utilizes infrared emissions from individual faces. That data may be collected passively and instantaneously, from a distance, at no risk to the individual. It is therefore particularly well-suited for security applications. Since IR imaging produces gray-scale images, this technique provides an excellent fit with the preferred invariant feature extraction discussed above.

The following observation can be made, without being bound by theory, regarding thermal facial imaging for feature recognition. Facial thermograms are apparently unique to the individual. Furthermore, "elemental shapes" in the thermograms correspond to vascular system features which are "hardwired-in" at birth. These shapes do not vary with variations in the absolute thermal map due to ambient and physiological changes. Due to their location on the face, these shapes do not change with facial expressions.

Since thermal images are essentially immune from variations caused by illumination and shadow, it is not necessary to control those variables or to train the system to recognize images in which those variables apply. Thus, the use of thermal facial images for recognition allows for uncontrolled lighting, including total darkness.

Further, since the elemental shapes of the facial thermogram do not vary with make-up, suntan, hair style, hair color, and other applied materials, it is not necessary to train the system on such variables. Furthermore, since the elemental shapes do not vary with time, it is not necessary to model aging effects.

Unfortunately, glasses may block the infrared emissions from the face, causing a loss of data in the facial area covered by the glasses. However, other elemental shapes in areas of the face not covered by the glasses may still be sufficient for positive identification because of the feature extraction algorithm and the neural network.

Moreover, facial thermograms readily detect accidental or intentional disguises, such as artificial facial or cranial hair, latex or other synthetic skin appliances, theatrical make-up and surgical scars. Automatic disguise detection using thermal images defeats attempts at before-the-lens tampering using mannequins or persons disguised to look like each another. It is impossible for one person to mimic another's facial thermogram.

The thermal elemental shapes are distinctive enough to each person that high confidence recognition can be performed on a partial face. The size of the thermal elemental shapes are large enough that they can be discerned from distances of 50 meters or more with existing commercial thermal imagers.

Data fusion using a combination of visual and IR images could be a very attractive embodiment. IR facial imagery preserves all of the measurement information seen in visual imagery; only skin tone is lost. Therefore, it is possible to correlate visual and IR imagery to determine, for example, whether the faces seen in an IR surveillance tape match any visual images. The correlation is not one-to-one because visual images are not unique. However, the unique thermal image can be used to eliminate all visual images that do not match it, and then to provide a confidence measure for matching the remaining images. The visual/IR image fusion obtained by means of passive IR imaging is a particularly preferred embodiment.

The foregoing descriptions of preferred embodiments are provided by way of illustration. Practice of the present invention is not limited thereto and variations therefrom will be readily apparent to those of ordinary skill in the art without deviating from the spirit and scope of the underlying inventive concept.

EXAMPLE

A specific embodiment of the invention will now be further described by the following, non-limiting working example which will serve to illustrate various features of significance. The example is intended merely to facilitate an understanding of ways in which the present invention may be practiced and to further enable those of skill in the art to practice the present invention. Accordingly, the example should not be construed as limiting the scope of the present invention.

In a preliminary experiment, a software package was developed to take live images from a CCD camera and perform invariant feature extraction, neural network training, and recognition operations for face identification. A specific data dependent SPR-invariant kernel transformation $$h(k, I(x,y)) = \mathrm{sinc}\left\{\left(\frac{I(x,y) - k\Delta I}{256}\right) \cdot k\right\},$$

, where $\Delta I$ is an intensity quantification level was developed. Further optimization of the discrimination capability of the SPR-invariant kernel transformation was considered to be a future thrust of additional research.

Figure 5A:
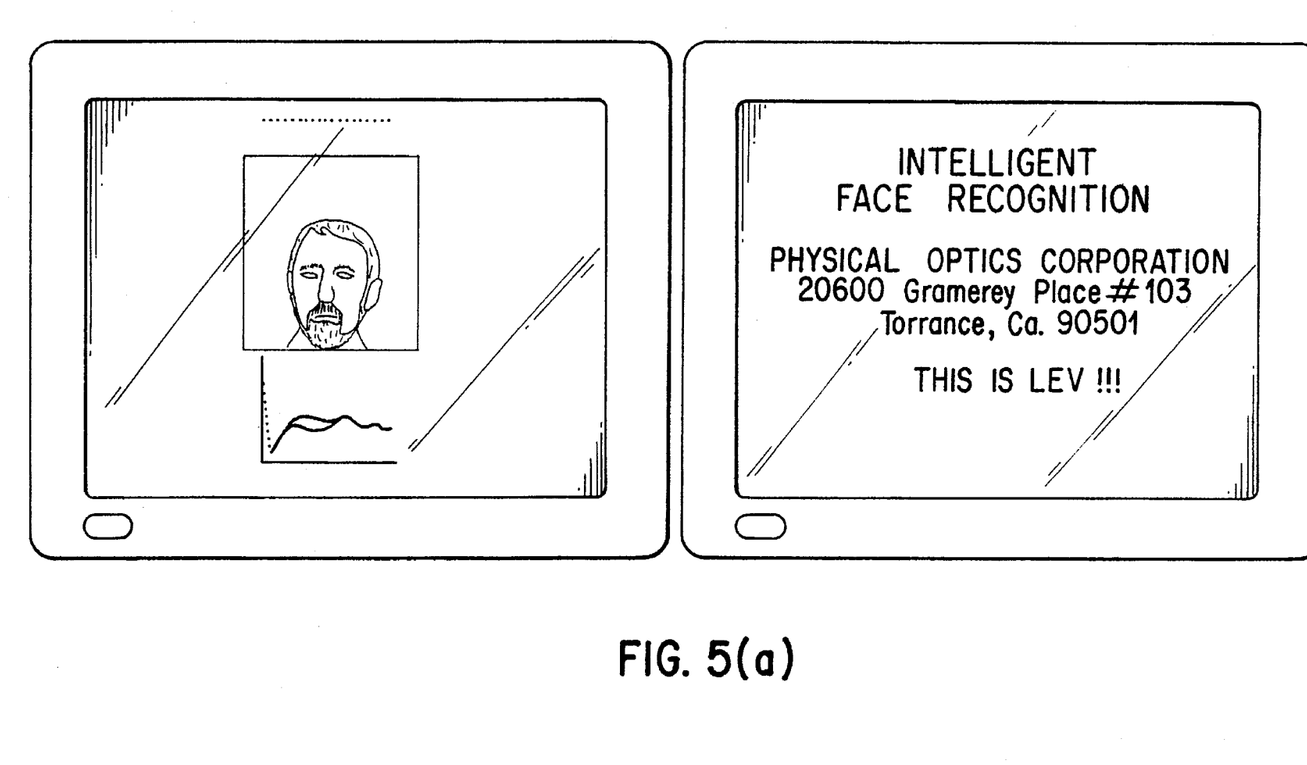
FIG. 5A illustrates recognition with a head in an upright position with an ordinary facial expression.
Figure 5B:
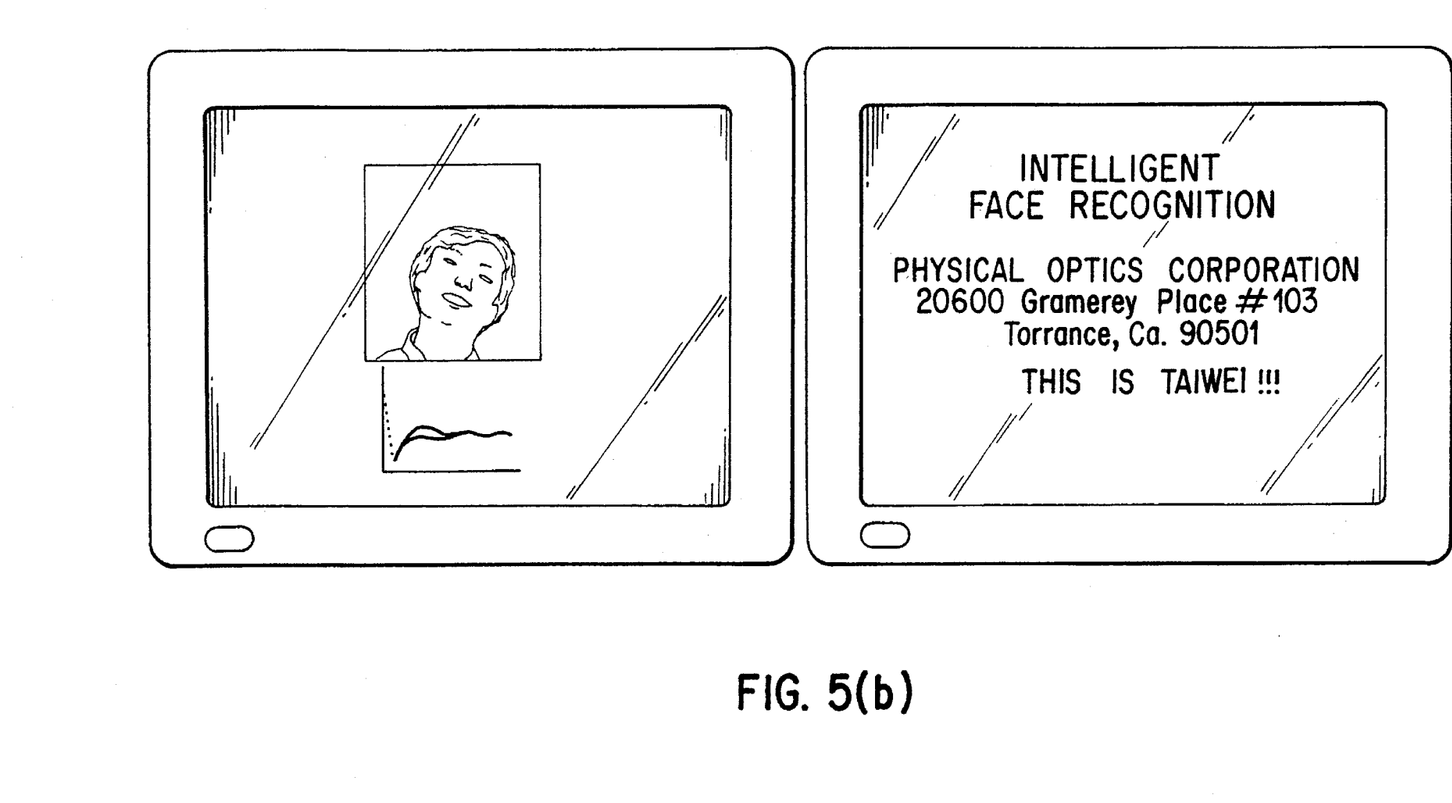
FIG. 5B illustrates recognition with a head in a tilted position with a changed facial expression.

Referring to FIGS. 5A and 5B, a 256×256 pixel image was taken from a CCD camera as shown on the left monitor in the photographs. A Sharp digital signal processor board calculated the 20-pixel invariant feature vector, as depicted by the faintly visible blue curve on the left monitor. Five to six poses of each person can be used for neural network training. The neural network consisted of three layers of 20 input neurons, 80-hidden layer neurons, and 10 output neurons. A back-propagation model was used for neural network training. It took about 40 minutes to train a 50 pattern database (each pattern corresponding to one pose of a face). It was foreseen that in the future, a gray-scale interpattern association (GS-IPA) model could be used for training so that the training speed would be greatly increased. After training, the network was used to recognize faces. Referring to FIG. 5B, a person can change facial expression, tilt, or move the head, but the system will still identify that person. From these results, we can see how the combination of the invariant feature extraction algorithm and neural network training provides a robust and distortion-invariant face recognition system.

Many neural network models have been developed. Examples include the Hopfield model, the Kohonen Self-Organizing network, ART, Neocognition and the back-propagation model. Some of the most powerful neural networks require a training time which is formidable for large neural network applications. To overcome this problem, a gray scale interpattern association (GS-IPA) neural network model that is capable of performing robust feature extraction, fast learning, and high-speed pattern recognition in very high background noise was developed.

The basic concept of the IPA model[7] is that special features are more important than common features in the pattern recognition operation. A set of logic rules were developed to extract special features from the training patterns and then excitative and inhibitive interconnections are built to emphasize the special features. As a result, the neural network becomes very sensitive to small differences in patterns, insensitive to noise, and capable of recognizing patterns in a very noisy environment.

In the newly-developed (GS-IAP) model, the neural network first normalizes the training set to a user-defined gray scale level. An occupational matrix C[i,j] is calculated for the input training patterns. This is to determine the number of the input patterns that share each pixel in the input space:

$$C[i,j] = \sum_k a_k(i,j),$$

and $$a_k(i,j) = \begin{cases} 1, & \text{if } x_k(i,j) \geq L \\ 0, & \text{elsewhere} \end{cases}$$

where $X_k(i,j)$ is the intensity value of the $k^{th}$ input training pattern at pixel $(i,j)$, and L is the lower boundary of the gray scale. The same calculation is done to generate the output occupational matrix:

$$D[i_o, j_o] = \sum_k b_k(i_o, j_o),$$

and $$b_k(i_o, j_o) = \begin{cases} 1, & \text{if } y_k(i_o, j_o) > 0 \\ 0, & \text{elsewhere} \end{cases}$$

where $y_k(i_o, j_o)$ is the intensity value of the $k^{th}$ output training pattern at pixel $(i_o, j_o)$. Since the output training patterns are designed as binary patterns, the lower boundary of the gray scale is zero. A cross-occupational matrix is computed as:

$$K_1(i,j,i_o,j_o) = \Sigma_k a_k[i,j] b_k[i_o,j_o] \qquad \text{Eq. (2)}$$

Eq. (2) determines the relationship between the input and output training patterns with regard to each corresponding pixel in the input and output spaces.

The rules for building the interconnection and the weight matrix are described below.

Rule 1: the input [i,j]th and the output [$i_o,j_o$]th neurons belong to the special features of the same input/output training pattern pairs. Therefore, input neuron [i,j] should excite output neuron [$i_o,j_o$].

Rule 2: the input and the output neurons belong to the special features of different input/output training pattern pairs. Input neuron [i,j] should inhibit output neuron [$i_o,j_o$].

Rule 3: in other cases, the input or the output neurons may belong to some common part of two training patterns which is of no significance to the pattern recognition task. Then we should ignore them by disconnecting the interconnection between input neuron [i,j] and output neuron [$i_o,j_o$].

After the neural network training, an interconnection weight matrix (IWM) TT [$i,j,i_o,j_o$] is generated. The neural network is ready for the gray scale image identification operation.

Figure 6A:
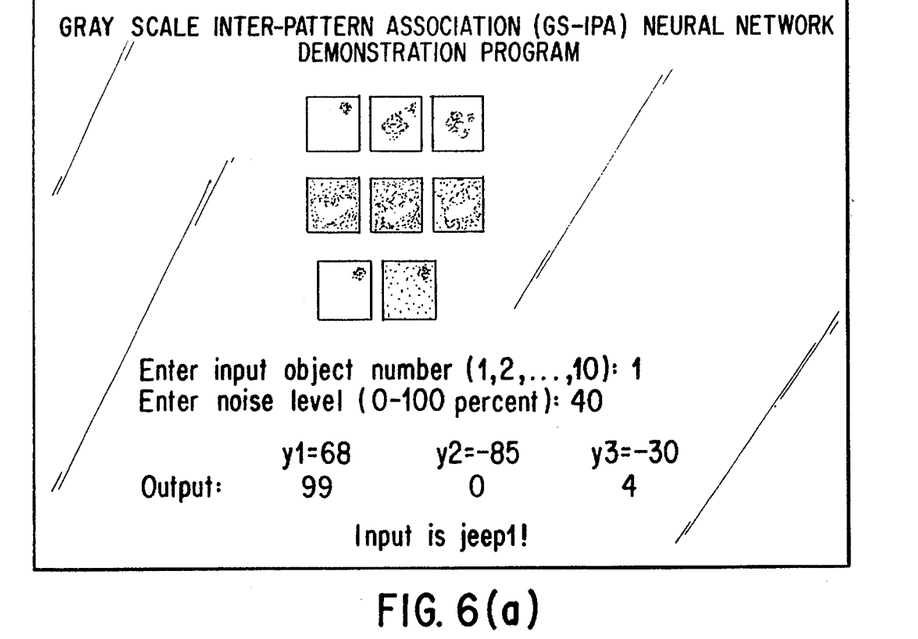
FIG. 6A illustrates training and testing a gray scale interpattern association neural network with a noise level.
Figure 6B:
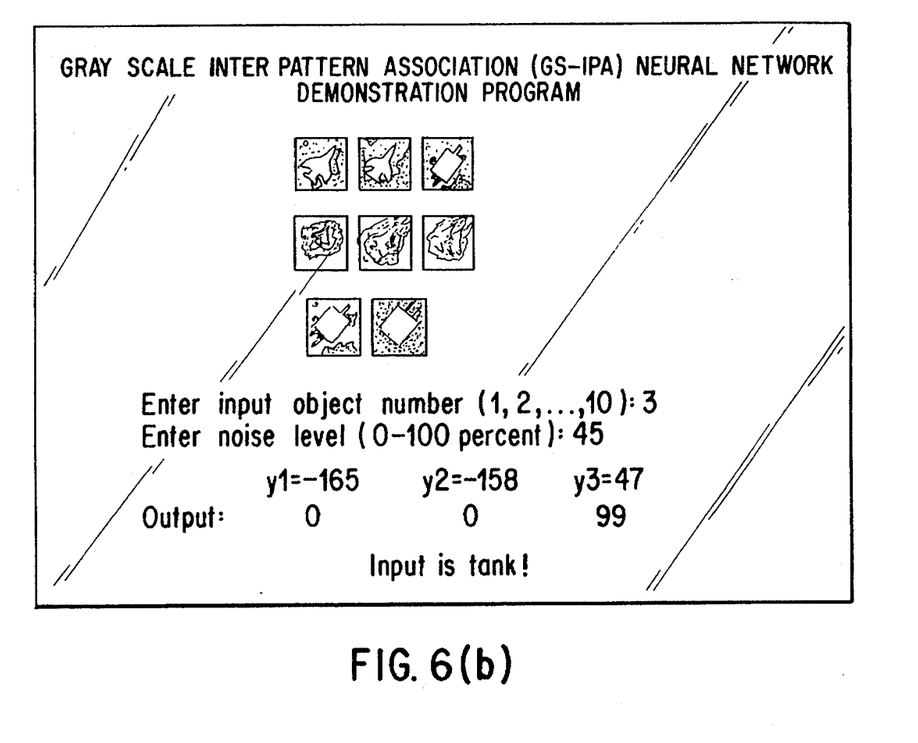
FIG. 6B illustrates training and testing a gray scale interpattern association neural network with different images and with a higher noise level than FIG. 6A.

FIGS. 6(a) and 6(b) show how a GS-IPA was trained with three objects. Referring to FIG. 6(b) two fighter planes and a tank can be seen in the first row of the 32×32 pseudo-color pattern. The second row displays the interconnection weight matrix (IWN) of a 32×32 input to three output neural networks. The training time took less than one second on a 486-based personal computer. An input pattern was then selected (i.e., the left pattern in the third row), and random noise was added to the input pattern (i.e., right pattern in the third row). The GS-IPA manifestly demonstrates high robustness in identifying images with very high noise. In this example, the signal-to-noise ratio was 1:1.5, and the pattern is almost unidentifiable with the human eye. However, the neural network exemplified in FIG. 6(b) recognizes the pattern as the tank with high confidence.

Although the best mode contemplated by the inventor(s) of carrying out the invention is disclosed above, many additions and changes to the invention could be made without departing from the spirit and scope of the underlying inventive concept. For example, numerous changes in the details of the orthogonal functions will be readily apparent to one of ordinary skill in the art without departing from the spirit and scope of the underlying inventive concept.

Moreover, while there are shown and described herein certain specific combinations embodying the invention for the purpose of clarity of understanding, the specific combinations are to be considered as illustrative in character, it being understood that only preferred embodiments have been shown and described. It will be manifest to those of ordinary skill in the art that certain changes, various modifications and rearrangements of the features may be made without departing from the spirit and scope of the underlying inventive concept and that the same is not limited to the particular forms herein shown and described except insofar as indicated by the scope of the appended claims. Expedient embodiments of the present invention are differentiated by the appended subclaims.

The entirety of everything cited above or below is expressly incorporated herein by reference.

REFERENCES

1. K. M. Lim, Y. C. Sim, and K. W. Oh, "A Face Recognition System Using Fuzzy Logic and Artificial Neural Network," IEEE International Conference on Fuzzy Systems Conference Paper, San Diego, pp. 1063–1069, (1992).
2. C. L. Huang and C. W. Chen, "Human Facial Feature Extraction for Face Interpretation and Recognition," Pattern Recognition, vol. 25, no. 12, pp. 1435–1444 (1992).
3. R. Brunelli and T. Poggio, "Face Recognition Through Geometrical Features," Computer Vision, Second European Conference on Computer Vision, Proceedings, pp. 792–800 (1992).
4. S. Edelman, D. Reisfield, and Y. Yeshurun, "Learning to Recognize Faces from Examples," Proceedings of Computer Vision, ECCV '92, pp. 787–791 (1992).
5. S. Akamatsu, T. Sasaki, H. Fukamachi, N. Masui, and Y. Suenaga, "An Accurate and Robust Face Identification Scheme," Proceedings of the 11th IAPR Internal Conference of Pattern Recognition, vol. II, pp. 217–220 (1992).
6. P. Flocchini, F. Gardin, G. Mauri, M. P. Pensini, and P. Stufella, "Combing Image Processing Operators and Neural Networks in a Face Recognition System," Int. J. pattern Recog. Artif. Intell., vol. 6, no. 2–3, pp. 447–467 (1992).
7. T. Lu, X. Xu, S. Wu, and F. T. S Yu, "Neural Network Model Using Interpattern Association," Appl. Opt., vol. 29, no. 2, p. 284 (1990).
8. N. Fapahati, A. Greun, N. Piercy, and L. Robinson, "Real Time Recognition Using Novel Infrared Illumination," Opt. Eng., vol. 31, pp. 1658–1662 (1992).
9. A. J. O'Toole, H. Abdi, K. A. Deffenbacher, and D. Valentin, "Low-Dimensional Representation of Faces in Higher Dimensions of the Face Space," J. Opt. Soc. Am. A, vol. 10, no. 3 (March 1993).
10. M. A. Turk and A. P. Pentland, "Face Recognition Using Eigenfaces," Proc. IEEE, pp. 586–591 (1991).
11. M. Kirby and L. Sirovich, "Application of the Karhunen-Loeve Procedure for the Characterization of Human Faces," IEEE Transactions on Pattern Analysis and Machine Intelligence, vol. 12, no. 1 (Jan. 1990).
12. G. G. Gordon and L. Vincent, "Application of Morphology to Feature Extraction for Face Recognition," SPIE vol. 1658, Nonlinear Image Processing III (1992).
13. G. G. Gordon, "Face Recognition Based on Depth and Curvature Features," Proc. IEEE, pp. 808–810 (1992).
14. R. Y. Wong and J. Calia, "PC-Based Human Face Recognition System," Proc. IEEE, pp. 641–644 (1992).
15. N. M. Allinson and A. W. Ellis, "Face Recognition: Combining Cognitive Psychology and Image Engineering," Electronics and Communication Engineering Journal, vol. 4, no. 5, pp. 291–300 (Oct. 1992).
16. J. M. Vincent, J. B. Waite, D. J. Myers, "Multilayered Perceptrons," IEEE Proceedings-F, vol. 139, no. 6, pp. 405–412 (Dec. 1992).
17. P. Seitz and M. Bichsel, "The Digital Doorkeeper'—Automatic Face Recognition with the Computer," IEEE International Carnahan Conference on Security Technology, Conference Paper, pp. 77–83 (1991).
18. G. Champleboux, S. Lavallee, R. Szeliski, L. Brunie, "From Accurate Range Imaging Sensor Calibration to Accurate Model-Based 3-D Object Localization," Proc. IEEE, pp. 83–89 (1992).
19. M. Siebert and A. M. Waxman, "Recognizing Faces From Their Parts," SPIE vol. 1611, Sensor Fusion IV (1991).
20. S. Akamatsu, T. Sasaki, N. Masui, H. Fukamachi, and Y. Suenaga, "A New Method for Designing Face Image Classifiers Using 3-D CG Model," SPIE vol. 1606, Visual Communications and Image Processing '91: Image Processing (1991).
21. A. M. Coombes, et al., "Description and Recognition of Faces from 3-D Data," SPIE, vol. 1766, Neural and Stochastic Methods in Image and Signal Processing, pp. 307–319 (1992).

What is claimed is:

1. A method of operating an image recognition system comprising:

providing a neural network including a plurality of input neurons, a plurality of output neurons and an interconnection weight matrix;

providing a display including an indicator, said display being electrically connected to said neural network;

initializing the indicator to an initialized state;

obtaining an image of a structure;

digitizing the image so as to obtain a plurality of input intensity cells and thereby define an input object space;

transforming the input object space to a feature vector including a set of n scale-, position- and rotation-invariant feature signals, where n is a positive integer not greater than the plurality of input neurons, by extracting the set of n scale-, position- and rotation-invariant feature signals from the input object space according to a set of relationships $I_k = \int_\Omega I(x,y) h(k, I(x,y)) \, dx \, dy$, where $I_k$ is the set of n scale-, position- and rotation- invariant feature signals, k is a series of counting numbers from 1 to n inclusive, (x,y) are the coordinates of a given cell of the plurality of input intensity cells, I(x,y) is a function of an intensity of the given cell of the plurality of input intensity cells, $\Omega$ is an area of integration of input intensity cells, and h(k,I(x,y)) is a data dependent kernel transform from a set of orthogonal functions, of I(x,y) and k;

transmitting the set of n scale-, position- and rotation-invariant feature signals to the plurality of input neurons of the neural network;

transforming the set of n scale-, position- and rotation-invariant feature signals at the plurality of input neurons to a set of structure recognition output signals at the plurality of output neurons according to a set of relationships defined at least in part by the interconnection weight matrix of the neural network;

transforming the set of structure recognition output signals to a structure classification signal; and transmitting the structure classification signal to the display so as to perceptively alter the initialized state of the indicator and display the structure recognition signal for the structure.

2. The method of claim 1 wherein transforming the input object space to a feature vector by extracting the set of n scale-, position- and rotation- invariant feature signals from the input object space includes normalizing the input object space according to the set of relationships $I_k=\int_\Omega I(x,y)h(k, I(x,y))\,dxdy$, where $$h(k,I(x,y)) = \text{sinc}\left\{ \left( \frac{I(x,y) - k\Delta I}{256} \right) \cdot k \right\}$$

and $\Delta I$ is a quantization level.

3. The method of claim 1 wherein transforming the input object space to a feature vector by extracting the set of n scale-, position- and rotation- invariant feature signals from the input object space includes normalizing the input object space according to the set of relationships $I_k=\int_\Omega I(x,y)h(k, I(x,y))\,dxdy$, where $h(k,I(x,y))$ is a Bessel function.

4. The method of claim 1 further comprising providing a reference database, wherein transforming the set of structure recognition output signals to a structure classification signal includes updating the interconnection weight matrix based on a comparison of the set of structure recognition output signals with the reference database.

5. The method of claim 1 wherein $h(k,I(x,y))$ decreases as k increases.

6. The method of claim 4 wherein transforming the input object space to a feature vector by extracting the set of n scale-, position- and rotation- invariant feature signals from the input object space includes normalizing the input object space according to the set of relationships $I_k=\int_\Omega I(x,y)h(k, I(x,y))\,dxdy$, where $$h(k,I(x,y)) = \text{sinc}\left\{ \left( \frac{I(x,y) - k\Delta I}{256} \right) \cdot k \right\}$$

and $\Delta I$ is a quantization level.

7. A method of operating an image recognition system comprising:

providing a camera;

providing a neural network including a plurality of input neurons, a plurality of output neurons and an interconnection weight matrix;

providing a display including an indicator, said display being electrically connected to said neural network;

initializing the indicator to an initialized state;

obtaining an image of a structure from the camera;

digitizing the image so as to obtain a plurality of input intensity cells and thereby define an input object space;

transforming the input object space to a feature vector including a set of n scale-, position- and rotation-invariant feature signals, where n is a positive integer not greater than the plurality of input neurons, by extracting the set of n scale-, position- and rotation-invariant feature signals from the input object space according to a set of relationships $I_k=\int_\Omega I(x,y)h[k,I(x,y)]\,dxdy$, where $I_k$ is the set of n scale-, position- and rotation- invariant feature signals, k is a series of counting numbers from 1 to n inclusive, (x,y) are the coordinates of a given cell of the plurality of input intensity cells, I(x,y) is a function of an intensity of the given cell of the plurality of input intensity cells, $\Omega$ is an area of integration of input intensity cells, and h(k,I(x,y)) is a data dependent kernel transform from a set of orthogonal functions, of I(x,y) and k;

transmitting the set of n scale-, position- and rotation-invariant feature signals to the plurality of input neurons of the neural network;

transforming the set of n scale-, position- and rotation-invariant feature signals at the plurality of input neurons to a set of structure recognition output signals at the plurality output neurons according to a set of relationships defined at least in part by the interconnection weight matrix of the neural network;

transforming the set of structure recognition output signals to a structure classification signal; and transmitting the structure classification signal to the display so as to perceptively alter the initialized state of the indicator and display the structure recognition signal for the structure.

8. The method of claim 7 wherein providing a camera includes providing an infra-red filtered camera and the image of the structure is an infrared filtered image.

9. The method of claim 7 further comprising providing a pulsed infrared illuminator electrically connected to the camera, wherein providing a camera includes providing an infra-red filtered camera and the image of the structure is an infra-red filtered image.

10. The method of claim 7 wherein transforming the input object space to a feature vector by extracting the set of n scale-, position- and rotation- invariant feature signals from the input object space includes normalizing the input object space according to the set of relationships $I_k=\int_\Omega I(x,y)h(k, I(x,y))\,dxdy$, where $$h(k,I(x,y)) = \text{sinc}\left\{ \left( \frac{I(x,y) - k\Delta I}{256} \right) \cdot k \right\}$$

and $\Delta I$ is a quantization level.

11. The method of claim 7 wherein transforming the input object space to a feature vector by extracting the set of n scale-, position- and rotation- invariant feature signals from the input object space includes normalizing the input object space according to the set of relationships $I_k=\int_\Omega I(x,y)h(k, I(x,y))\,dxdy$, where $h(k,I(x,y))$ is a Bessel function.

12. The method of claim 7 further comprising providing a reference database, wherein transforming the set of structure recognition output signals to a structure classification signal includes updating the interconnection weight matrix based on a comparison of the set of structure recognition output signals with the reference database.

13. The method of claim 5 wherein $h(k,I(x,y))$ decreases as k increases.

14. An image recognition system comprising:

a neural network including a plurality of input neurons, a plurality of output neurons and an interconnection weight matrix;

a display including an indicator, said display being electrically connected to said neural network;

means for initializing the indicator to an initialized state;

means for obtaining an image of a structure;

means for digitizing the image so as to obtain a plurality of input intensity cells and thereby define an input object space;

means for transforming the input object space to a feature vector including a set of n scale-, position- and rotation-invariant feature signals, where n is a positive integer not greater than the plurality of input neurons, by extracting the set of n scale-, position- and rotation-invariant feature signals from the input object space according to a set of relationships $I_k = \int_\Omega I(x,y)h(k,I(x,y))\,dxdy$, where $I_k$ is the set of n scale-, position- and rotation- invariant feature signals, k is a series of counting numbers from 1 to n inclusive, (x,y) are the coordinates of a given cell of the plurality of input intensity cells, I(x,y) is a function of an intensity of the given cell of the plurality of input intensity cells, $\Omega$ is an area of integration of input intensity cells, and h(k,I(x,y)) is a data dependent kernel transform from a set of orthogonal functions, of I(x,y) and k;

means for transmitting the set of n scale-, position- and rotation- invariant feature signals to the plurality of input neurons of the neural network;

means for transforming the set of n scale-, position- and rotation- invariant feature signals at the plurality of input neurons to a set of structure recognition output signals at the plurality output neurons according to a set of relationships defined at least in part by the interconnection weight matrix of the neural network;

means for transforming the set of structure recognition output signals to a structure classification signal; and means for transmitting the structure classification signal to the display so as to perceptively alter the initialized state of the indicator and display the structure recognition signal for the structure.

15. The image recognition system of claim 14 further comprising an infra-red filter optically connected to the means for obtaining an image, wherein the means for obtaining an image of a structure comprises an infra-red filtered camera and the image of the structure is an infra-red filtered image of a structure.

16. The image recognition system of claim 15 further comprising a pulsed infra-red illuminator synchronized with the infra-red filtered camera.

17. The image recognition system of claim 14 wherein the means for transforming the input object space to a feature vector by extracting the set of n scale-, position- and rotation- invariant feature signals from the input object space includes means for normalizing the input object space according to the set of relationships $I_k = \int_\Omega I(x,y)h(k,I(x,y))\,dxdy$, where $$h(k,I(x,y)) = \mathrm{sinc}\left\{ \left( \frac{I(x,y) - k\Delta I}{256} \right) \cdot k \right\}$$

and $\Delta I$ is a quantization level.

18. The image recognition system of claim 14 wherein the means for transforming the input object space to a feature vector by extracting the set of n scale-, position- and rotation- invariant feature signals from the input object space includes means for normalizing the input object space according to the set of relationships $I_k = \int_\Omega I(x,y)h(k,I(x,y))\,dxdy$, where h(k,I(x,y)) is a Bessel function.

19. The image recognition system of claim 14 further comprising means for providing a reference database electrically connected to the neural network, wherein the means for transforming the set of structure recognition output signals to a structure classification signal includes means for updating the interconnection weight matrix based on a comparison of the set of structure recognition output signals with the reference database.

20. The image recognition system of claim 14 wherein said means for obtaining an image of a structure includes a camera and h(k,I(x,y)) decreases as k increases.

\* \* \* \* \*